United States Patent [19]
Cornsweet

[11] 3,723,648
[45] Mar. 27, 1973

[54] METHOD AND APPARATUS FOR DISCRIMINATING AGAINST MASKING REFLECTIONS

[75] Inventor: Tom N. Cornsweet, Atherton, Calif.
[73] Assignee: Stanford Research Institute, Menlo Park, Calif.
[22] Filed: Feb. 1, 1971
[21] Appl. No.: 111,280

[52] U.S. Cl. .................................178/6.8, 178/6
[51] Int. Cl. .................................H04n 7/18
[58] Field of Search.......356/178, 179, 229; 340/4 R; 178/DIG. 33, 6, 6.8

[56] References Cited

UNITED STATES PATENTS

| | | | |
|---|---|---|---|
| 3,332,313 | 2/1967 | Batson | 356/129 |
| 1,898,219 | 2/1933 | Sharp | 356/179 |
| 2,139,460 | 12/1938 | Potapenko | 340/4 R |
| 3,441,349 | 4/1969 | Day | 356/179 |

Primary Examiner—Robert L. Griffin
Assistant Examiner—Joseph A. Orsino, Jr.
Attorney—Flehr, Hohbach, Test, Albritton & Herbert

[57] ABSTRACT

A method and means for discriminating against masking reflections reflected by an object or medium separating an observer from an object which it is desired to view. The desired object and medium are both illuminated by two alternating light sources emitting light of two different wave lengths. The light sources are adjusted so that a detector detects equal amounts of light reflected by the masking medium due to each light source. Assuming, however, that the object which it is desired to view has different spectral characteristics than the masking medium, it will reflect varying amounts of light from the two light sources as the light sources alternate. The reflected light from both the medium and the desired object is incident on a sensing means such as an image dissector and means are provided to separate the AC signal which will be due to reflections from the desired object from the DC signal which will be due to reflections from the masking medium.

6 Claims, 2 Drawing Figures

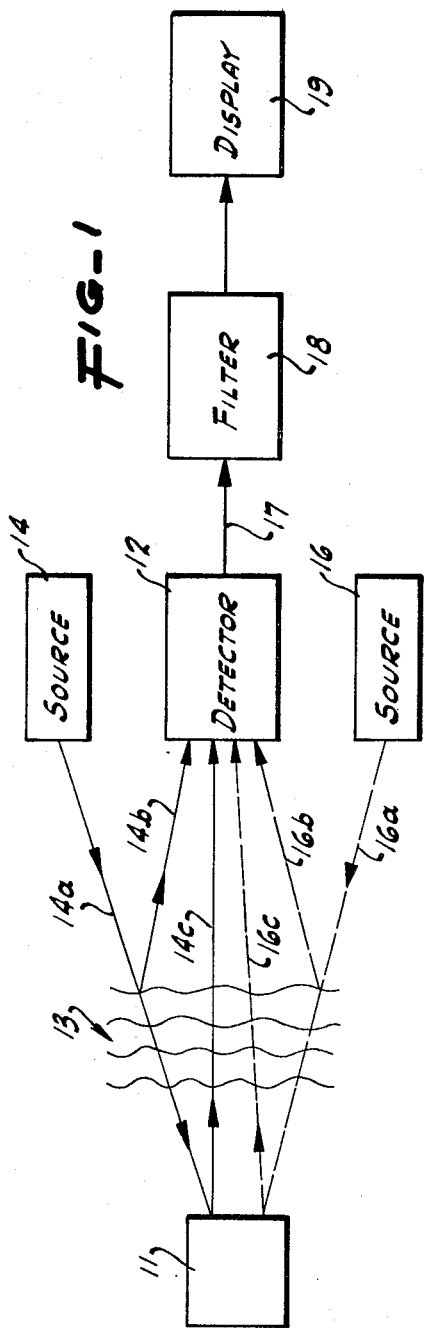
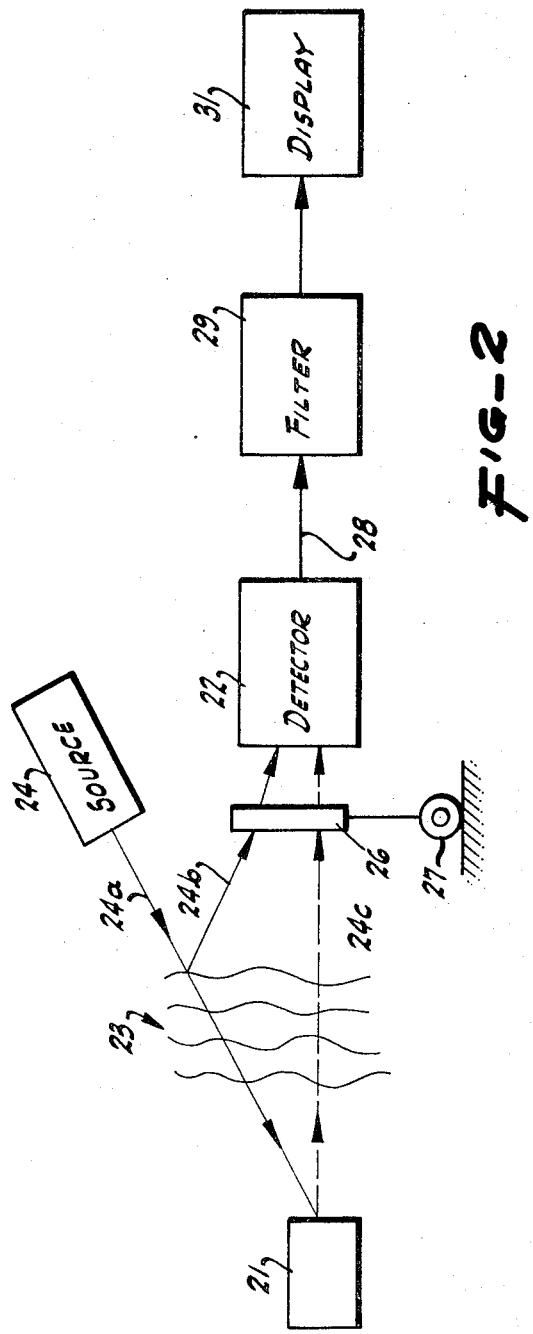

METHOD AND APPARATUS FOR DISCRIMINATING AGAINST MASKING REFLECTIONS

BACKGROUND OF THE INVENTION

This invention pertains to a method and means for viewing a desired object through a masking medium and more particularly pertains to a method and means for discriminating against masking reflections.

There are many situations where it is desired to view an object but where the viewer and the object which it is desired to view are separated by another object or medium. This intervening object or medium reflects the illuminating light to form masking reflections which either partially or totally obscure the object which it is desired to view. Familiar examples of such situations include fog and turbid waters. The water droplets in fog or the turbid waters reflect illuminating light to the viewer to produce masking reflections which partially or totally obscure the object or scene which it is desired to view. Still another situation in which it would be very desirable to eliminate masking reflections is in examining a human eye. For example, it is very difficult to view the retina of an eye because of the masking reflections which are reflected from the cornea of the eye.

SUMMARY OF THE INVENTION

Accordingly, it is an object of this invention to provide a method and means for discriminating against masking reflections.

It is another object of this invention to provide a method and means for viewing an object separated from a viewer by a masking medium.

Briefly, in accordance with one embodiment of the invention, an object and a masking medium which have different spectral reflection characteristics are alternately illuminated with light from two light sources with each of the light sources having a different spectral out put. The intensities of the two light sources are adjusted so that the amount of light from one light source that is reflected by the masking medium is approximately equal to the amount of light from the other light source that is reflected by the masking medium, as sensed by a detector. The total light reflected by the object and masking medium as the two light sources alternate is sensed and an electrical signal is generated in response thereto. This electrical signal is filtered to extract the AC portion thereof from the DC portion thereof. The AC portion of the electrical signal is converted into a display whereby a view of only the object is obtained.

BRIEF DESCRIPTION OF THE DRAWINGS

FIG. 1 is a diagrammatic illustration of one embodiment of the invention in which two alternately excited light sources are utilized.

FIG. 2 shows another embodiment of the invention in which one light source is utilized together with a rotating or rapidly alternating optical filter.

DESCRIPTION OF THE PREFERRED EMBODIMENTS

Referring to FIG. 1, there is shown an object 11 which is separated from a detector 12 by a masking medium generally indicated by reference numeral 13. The masking medium 13 can be, for example, fog or turbid waters which reflect illuminating light to form masking reflections which either partially or totally obscure the detector 12's view of the obJect 11. In accordance with this invention two light sources 14 and 16 are provided which have different spectral characteristics. For example, light source 14 may emit green light and light source 16 may emit red light. The light source 14 emits a green light beam 14a which illuminates the masking medium 13 which reflects some of light beam 14a to form a masking reflection 14b. The light beam 14a also illuminates the object 11 which reflects a portion thereof to form a reflected object beam 14c. In a similar fashion the light source 16 emits a red light beam 16a which illuminates the masking medium 13 which reflects a portion of the light beam 16a to form a masking reflection 16b. The light beam 16a also illuminates the object 11 which reflects a portion of the beam 16a to form a reflected object beam 16c. It is assumed that the masking medium and the object 11 have different spectral characteristics, i.e., they are different colors. The light sources 14 and 16 are alternately excited so that they alternately illuminate the scene consisting of masking medium 13 and object 11. The intensities of the light sources 14 and 16 are adjusted such that the green masking reflection light beam 14b reflected by the masking medium 13 and the red masking reflection 16b reflected by the masking medium 13 have equal intensities as sensed by a detector 12. Since the masking reflected light beams 14b and 16b are equal and the masking medium 13 and object 11 have different spectral characteristics then the light beam 14c and 16c reflected by the object 11 will be of unequal intensities.

The masking reflections 14b and 16b and the object reflections 14c and 16c are all incident on a detector 12 which can be, for example, a photodetector or a television camera, depending upon the type of display output desired. The detector 12 develops an output signal on its output circuit 17 which is an electrical signal proportional to the light beams incident thereon. Assume that the detector 12 is a non-storage type of television camera such as an image dissector. Since the masking reflection light beams 14b and 16b are adjusted to be equal as sensed by the detector, they produce a DC component on the output circuit 17 as the light sources 14 and 16 alternate. However, as discussed above, the object reflected light beams 14c and 16c will be unequal so that in combination they produce an AC component on the output circuit 17. A filter 18 is provided for separating the AC component of the signal on the output circuit 17 from the DC component thereon. A display 19 receives the AC component from filter 18 and produces an appropriate display in response thereto. For example, the display 19 can be a television receiver and the AC component of the light received by the detector 12 is reconstructed to produce an image on the television receiver 19 of only the object 11 with the masking reflections from the masking medium 13 removed. In this manner it is possible to view the object 11 through the masking medium 13 without reproducing the obscuring reflections from the masking medium 13.

FIG. 2 shows another embodiment of the invention in which only one source is utilized. As before, there is provided an object 21 separated from a detector 22 by a masking medium generally indicated by reference numeral 23. The object and the masking medium 23 are assumed to have differing spectral characteristics and they are both illuminated by a light source 24. The light source 24 puts out a light beam 24a which illuminates both the masking medium 23 and the object 21. The masking medium 23 reflects a portion of the light 24a to form a masking reflection 24b and the object 21 reflects a portion of the light beam 24a to form a reflected object beam 24c. The masking reflected light 24b and the object reflected light 24c pass through an optical filter 26 and are incident on a detector 22. The optical filter 26 can be, for example, a color filter which is rotatably driven by means such as a motor 27 to rotate in front of the detector 22. The optical filter 26 has at least two distinct portions and filters the light beams 24b and 24c through a filter of one color (green) and alternately filters the light beams 24b and 24c through an optical filter of another color (red). The light transmission characteristics of the two portions of the optical filter 26 are adjusted so that each portion of the optical filter 26 transmits an equal amount of the light beam 24b, as sensed by the detector 22. Since, however, the object 21 has different spectral characteristics than the masking medium 23, the amounts of the reflected object light beam 24c transmitted through the two different portions of the optical filter 26 will be unequal. The detector 22 can, again, be a photodetector or a television camera depending upon the type of display output desired. Assuming that the detector 22 is a television camera of the non-storage type, such as an image dissector, the light reflected by the masking medium 23 in the form of the masking reflection light beam 24b produces a DC output on the detector's output 28 as the optical filter 26 rotates whereas the light beam 24c reflected by the object 21 produces an AC component on the output 28 of detector 22 as the optical filter 26 rotates. The filter should rotate very rapidly with respect to the scanning rate of the detector 22. Thus with mechanical rotation a detector is used which has a slow scan rate. Alternatively, a fast scanning detector can be used with a stationary filter whose transmission characteristics are electronically controlled. A filter 29 is provided to separate the AC component from the detector's output 28 and this AC signal is used to drive a display but in accordance with one embodiment is a television receiver. Thus the display 31 which is a television receiver reproduces a picture of the object 21 without the obscuring effects of masking reflections from the masking medium 23.

Many equivalent alternatives to the embodiments shown and described in connection with FIGS. 1 and 2 will occur to those skilled in the art. For example, the detectors 12 or 22 can be a television camera in which one source, for example source 14, is on for one frame of the television camera 12 with the other source 16 being on for the next frame of the television camera. Succeeding frames could then be substracted with the output of the television camera adjusted such that a zero output is some level of gray, with a minus output being black and a plus output being white. The difference between the succeeding frames is thus a picture of the object without the obscuring effect of masking reflections.

Thus what has been described is a method and means for viewing an object through a masking medium and eliminating obscuring masking reflections from the masking medium.

I claim:

1. A method for viewing an object separated from a viewer by a masking medium wherein the object and the masking medium have different spectral reflection characteristics comprising the steps of illuminating the object and masking medium with alternating light from two light sources having different spectral outputs, adjusting the intensities of the two light sources so that the amount of light from one light source that is reflected by the masking medium is approximately equal to the amount of light from the other light source that is reflected by the masking medium, sensing the total light reflected by the object and masking medium as the two light sources alternate and generating an electrical signal in response thereto, filtering the electrical signal to extract the AC portion thereof and displaying the AC portion whereby a view of only the object is displayed.

2. A method for viewing an object separated from a viewer by a masking medium wherein the object and the masking medium have different spectral reflection characteristics comprising the steps of illuminating the object and masking medium with light to form a reflected object beam and a reflected masking beam, alternately filtering the reflected object and masking beams with at least two filters having different spectral characteristics with light transmissivity of the at least two filters adjusted so that equal intensities of the reflected masking beam are transmitted therethrough, sensing the filtered reflected object and masking beams as the at least two filters are alternated and generating an electrical signal in response thereto, separating AC components of the electrical signals from DC components thereof and converting the AC portion to a display whereby a view of only the object is obtained.

3. Apparatus for viewing an object separated from a viewer by a masking medium wherein the object and the masking medium have different spectral reflection characteristics comprising alternately excited first and second light sources for illuminating the object and masking medium whereby object and masking reflected light beams are formed, said first and second light sources being adjusted so that the masking reflected light beams due to each source are of the same intensity, sensing means responsive to said reflected object and masking light beams for developing an electrical signal, and display means responsive to said electrical signal for generating a display which is a view of the object uncontaminated by masking reflections, said sensing means comprising a television camera having a frame rate approximately equal to the rate of alternation of said first and second light sources and including means for subtracting succeeding frames to form a difference signal whereby said display means is responsive to said difference signal for generating a display which is a view of the object uncontaminated by masking reflections.

4. Apparatus for viewing an object separated from a viewer by a masking medium wherein the object and the masking medium have different spectral reflection characteristics comprising light source means forming a light beam for illuminating the object and masking medium whereby object and masking medium reflected light beams are formed, an optical filter having at least two portions having different spectral characteristics, means for positioning said optical filter so that in an alternate fashion each of the two portions thereof filters both said object and masking medium reflected light beams to form filtered object and masking medium reflected light beams, a detector on which said filtered object and masking medium reflected light beams are incident, said detector adapted to generate an electrical signal, having an AC and a DC component in response thereto, the light transmissivity of said two portions being adjusted so that as the two portions alternate equal intensities of masking medium filtered reflected light beams are transmitted therethrough as sensed by said detector, and display means responsive to said AC component for generating a display of the object uncontaminated by masking reflections.

5. Apparatus in accordance with claim 4 including filtering means for separating said electrical signal into AC and DC components and wherein said display means is responsive to said AC component.

6. Apparatus for viewing an object separated from a viewer by a masking medium wherein the object and the masking medium have different spectral reflection characteristics comprising light source means forming a light beam for illuminating the object and masking medium whereby object and masking medium reflected light beams are formed, an optical filter having at least two portions having different spectral characteristics, means for positioning said optical filter so that in an alternate fashion each of the two portions thereof filters both said object and masking medium reflected light beams to form filtered object and masking medium reflected light beams, a detector on which said filtered object and masking medium reflected light beams are incident, said detector adapted to generate an electrical signal having an AC and a DC component in response thereto, the light transmissivity of said two portions being adjusted so that as the two portions alternate equal intensities of masking medium filtered reflected light beams are transmitted therethrough as sensed by said detector, and display means responsive to said AC component for generating a display of the object uncontaminated by masking reflections, said detector comprising a television camera having a frame rate approximately equal to the rate of alternation of said first and second portions of said optical filter and including means for subtracting succeeding frames to form a difference signal whereby said display means is responsive to said difference signal for generating a display which is a view of the object uncontaminated by masking reflections.

* * * * *